United States Patent [19]
Mine et al.

[11] Patent Number: 5,761,169
[45] Date of Patent: Jun. 2, 1998

[54] METHODS AND APPARATUS FOR RECORDING TO AND REPRODUCING FROM AN OPTICAL MASTER DISC DATA TO EMULATE THE BEHAVIOR OF A REPRODUCING ONLY OPTICAL DISC

[75] Inventors: Norichika Mine; Hideo Tada, both of Kanagawa, Japan

[73] Assignee: Sony Corporation, Tokyo, Japan

[21] Appl. No.: 626,915

[22] Filed: Apr. 3, 1996

Related U.S. Application Data

[63] Continuation of Ser. No. 490,092, Jun. 6, 1995, abandoned, which is a continuation of Ser. No. 125,329, Sep. 22, 1993, abandoned.

[30] Foreign Application Priority Data

Sep. 24, 1992 [JP] Japan .................................. 4-280458

[51] Int. Cl.$^6$ ........................................................ G11B 7/00
[52] U.S. Cl. ................................. 369/84; 369/85; 369/54; 369/58
[58] Field of Search .................................. 369/84, 85, 83, 369/54, 58, 59, 48, 47; 360/13, 14.1, 14.2, 14.3, 15, 16

[56] References Cited

U.S. PATENT DOCUMENTS

| 4,682,246 | 7/1987 | Efron et al. ........................ 369/58 X |
| 4,823,333 | 4/1989 | Satoh et al. ........................ 369/84 |
| 5,088,081 | 2/1992 | Farr ........................................ 369/58 X |
| 5,402,406 | 3/1995 | Fuma et al. ........................ 369/84 |

*Primary Examiner*—Muhammad N. Edun
*Attorney, Agent, or Firm*—Limbach & Limbach L.L.P.

[57] ABSTRACT

An optical disc apparatus and data recording method simplifies debugging when supplying a large quantity of software with a the reproducing only optical disc in place of a optical magnetic disc. The optical disc apparatus and data recording method converts a data sequence into a format to be recorded on reproducing only optical discs and records on an optical magnetic disc. The behavior when accessing optical discs will be restored in utilizing such optical magnetic disc.

12 Claims, 10 Drawing Sheets

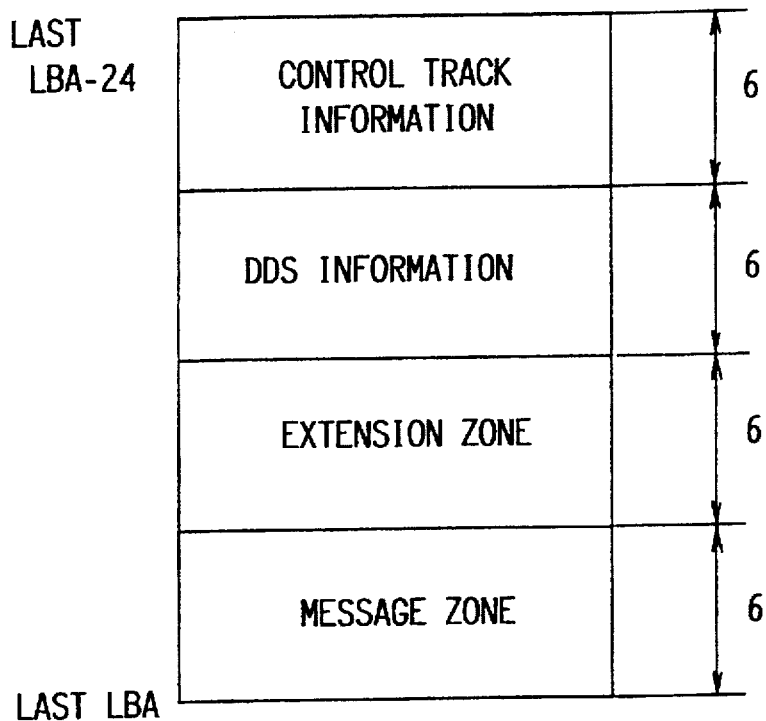
FIG. 7
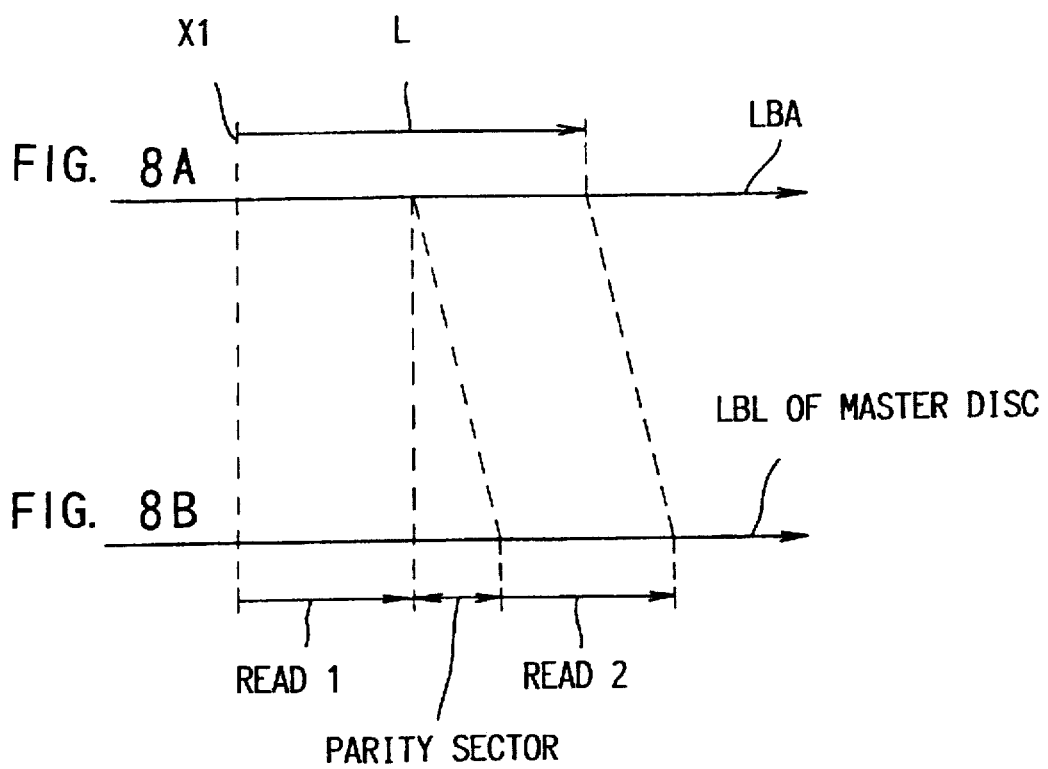
FIG. 8A
FIG. 8B

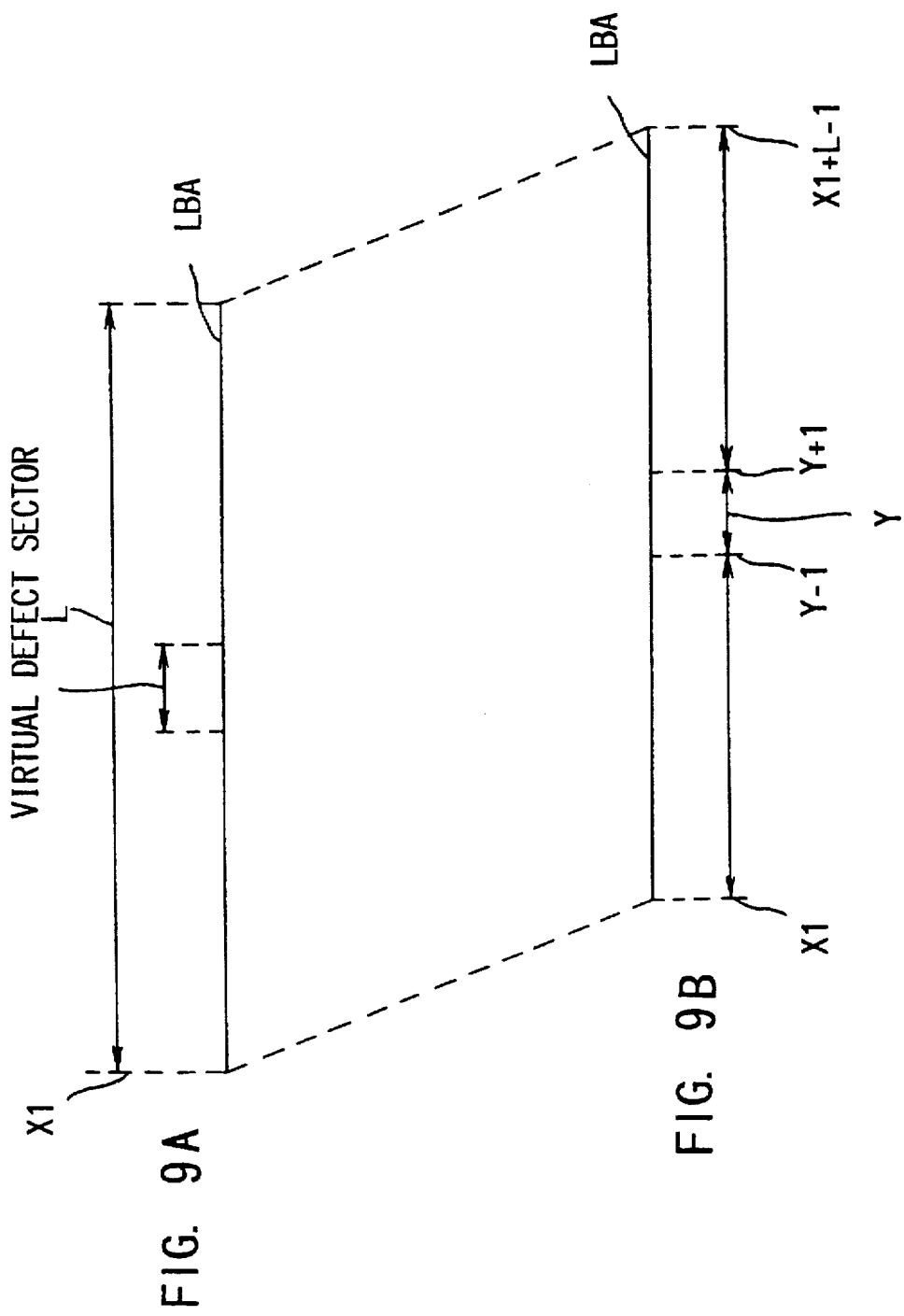

METHODS AND APPARATUS FOR RECORDING TO AND REPRODUCING FROM AN OPTICAL MASTER DISC DATA TO EMULATE THE BEHAVIOR OF A REPRODUCING ONLY OPTICAL DISC

This is a continuation of application Ser. No. 08/490,092 filed Jun. 6, 1995 now abandoned, which is a continuation of application Ser. No. 08/125,329 filed on Sep. 22, 1993 now abandoned.

BACKGROUND OF THE INVENTION

1. Field of the Invention

This invention relates to an optical disc apparatus and a data recording method, and more particularly, to providing a large quantity of software on a reproducing optical disc in place of the optical magnetic disc for example.

2. Description of the Related Art

Heretofore, in an optical disc apparatus, a the prescribed modulation magnetic field is formed on an optical magnetic disc by irradiating the disc with an optical beam and thus, by applying a thermal magnetic recording method desired information can be recorded on it.

With this type of optical disc apparatus, however when reproducing the recorded information an optical beam of a prescribed polarized wave face is irradiated onto the optical magnetic disc and the change of polarized wave face of reflected light is detected.

More specifically, in the optical disc apparatus, reflection light from the optical disc is lead to the deflection beam splitter, and incident light and reflected light are received at the prescribed light receiving element respectively.

Furthermore, in the optical disc apparatus, an output signal is generated by this light receiving element which performs a subtraction process to detect a change of the polarized wave plane of the reflected light.

With the above arrangement, in the optical disc apparatus the desired information can be reproduced in utilizing the Kerr effect.

Hereupon, since this type of optical disc apparatus can be used connecting such apparatus to various data processing apparatuses, various softwares can be supplied by using this type of optical magnetic disc.

It would be convenient, however, if a large quantity of this type of software could be supplied in utilizing one stamper.

In this case, the method to produce the optical disc for reproduction only, such as the compact disc by using the recording format of this type of optical magnetic disc can be considered.

More specifically, with this type of optical disc apparatus, a reproduction signal, the signal level of which is changed corresponding to the quantity of light of reflection light beam, can be obtained by addition processing instead of by subtraction processing of the output signal corresponding to incident light at the deflection beam splitter and the light receiving element to receive reflected light.

Accordingly, in this type of optical disc apparatus, the reproduction signal can be easily obtained from this optical disc by loading the optical disc on which information are recorded on uneven face, such as a compact disc.

With this arrangement, if the information is recorded on this optical disc with the same format as those of optical magnetic disc, software can be supplied to this type of optical disc by means of the reproducing only optical disc and thereby a large quantity of software can be supplied easily.

However, regarding the software to be supplied as described above, there are many defects to be detected after actually being used in the apparatus and there are many cases where debugging is repeated time after time.

Especially, since this type of reproducing optical disc has a large recording capacity, it is considered that it can be applied to the software of a large scale and in this case the debugging operation becomes complicated.

On the other hand, in the case of producing this type of reproducing only optical disc, since after cutting and producing the master stamper, a large quantity of discs are to be produced by using this stamper, a great deal of time and process will be required until finally they are loaded in the apparatus and their functions can be confirmed.

Because of this, if we try to supply a large quantity of softwares in utilizing this type of reproducing optical disc, in practice, it would take time and process for debugging and after all, it has been difficult to supply the software easily by applying to this type of optical disc apparatus.

SUMMARY OF THE INVENTION

In view of the foregoing, an object of this invention is to provide an optical disc apparatus and a data recording method which are capable of simplifying debugging.

The foregoing object and other objects of this invention have been achieved by the provision of an optical disc apparatus and a data recording method in which, after forming conversion data by converting the data sequence to be recorded on reproducing only optical discs 28 and 40 to a format for recording on reproducing only optical discs 28 and 40, the conversion data is recorded on an optical magnetic disc 4 which optical magnetic disc is capable of recording and reproducing, and the behavior in case of reproducing the data sequence recorded on reproducing only optical discs 28 and 40 can be confirmed at the optical magnetic disc 4.

Furthermore, reproducing only optical discs 28 and 40 divide the recording zone into 25 sectors and by allocating parity sector of 1 sector on 24 sectors out of 25 sectors from the recording area of data sequence and the control track and DDS (disc definition structure) zone in front and in rear of the recording area of data sequence.

Moreover, the optical magnetic disc 4 also records data for producing reproducing only optical discs 28 and 40 in case of recording the conversion data.

Furthermore, in case of recording the conversion data, the optical magnetic disc 4 records the prescribed management data in addition to the data for producing the reproducing only optical discs 28 and 40.

Furthermore, the data sequence recorded on the reproducing only discs 28 and 40 can be reproduced by connecting to the prescribed information processing device according to the processing procedure of the information processing device 20 and the optical magnetic disc 4 in which data sequence is recorded upon converting to the format in case of recording on the reproducing only optical discs 28 and 40 is reproduced in place of reproducing only optical discs 28 and 40. In case of reproducing the optical magnetic disc 4, by converting the address data at the time of reproducing the reproducing only optical discs 28 and 40 to the address data of the optical magnetic disc 4, the optical magnetic disc 4 will be reproduced by means of the prescribed address conversion means 44, and the behavior in case of processing the data sequence recorded on the reproducing only optical discs 28 and 40 can be confirmed at the information processing device 20 in utilizing the optical magnetic disc 4.

Furthermore, there is a disc driver 32 which drives optical discs 28 and 40 and the optical magnetic disc 4, and the disc driver 32 converts the command of logical drive to be outputted from the information processing device 20 to the command of physical drive and has access to optical discs 28 and 40 and at the time when converting the logical drive command has access to the optical magnetic disc 4 in place of optical discs 28 and 40 by converting the address data through the address conversion means 44.

Furthermore, optical discs 28 and 40 divide the recording zone into 25 sectors and form the recording area of data sequence by assigning the parity sector of 1 sector on 24 sectors out of 25 sectors, and the optical magnetic disc 4 records the recording data of data sequence and parity sector. In case of reproducing the optical magnetic disc 4 the optical disc apparatus 22 is arranged to be able to assign sectors of optical discs 28 and 40 by means of the prescribed sector assignment means 50 and reproduces the data of parity sector corresponding to the sector assigned and the data of sectors excluding sectors assigned from 24 sectors corresponding to the parity sector, and forms the data of sector assigned by forming the resultant exclusive OR.

By converting data sequence to be recorded on the reproducing only optical discs 28 and 40 to the format in case of recording on reproducing only optical discs 28 and 40 and forming conversion data, this conversion data will be recorded on the optical magnetic disc 4 which is capable of recording and reproducing, and if the behavior in case of reproducing the data sequence recorded on reproducing only optical discs 28 and 40 can be confirmed at the optical magnetic disc 4, debugging can be easily processed.

At this point, by assigning the parity sector and forming the recording zone of data sequence and by forming control track and DDS zone in front and in rear of the recording zone of data sequence, debugging can be easily processed in the same manner as those of reproducing actual optical discs 28 and 40.

Furthermore, since the production data for the reproducing only optical discs 28 and 40 are recorded at the same time, the stamper can be produced easily and certainly after debugging process has been executed. Also, the data for the prescribed management use will be recorded and the usability can be improved.

In regard to reproducing the data sequence recorded on reproducing only optical discs 28 and 40, according to the processing procedure of the information processing device 20, the data sequence converted to the format for recording on the reproducing only optical discs 28 and 40 will be recorded on the optical magnetic disc 4, and this optical magnetic disc 4 will be reproduced in place of reproducing only optical discs 28 and 40. At this point, through an address conversion means 44 by converting the address data for the reproducing only optical discs 28 and 40 to the address data for the optical magnetic disc 4 and by reproducing the optical magnetic disc 4, the behavior at the time of processing the data sequence of the reproducing only optical discs 28 and 40 can be easily confirmed by utilizing the optical magnetic disc 4.

At this point, by converting address data through the address conversion means 44 at the time when the command of logical drive to be outputted from the information processing device 20 is converted to the command of physical drive at the disc driver 32, debugging processing can be easily performed at the optical magnetic disc 4 adding the address conversion means 44.

Furthermore, the data of parity sector corresponding to appointed sectors and the data of sectors excluding sectors appointed from 24 sectors corresponding to parity sector will be reproduced, and by forming the resultant exclusive OR from the reproduction result, the data of appointed sectors formed during the actual defect processing operation at the reproducing only optical discs 28 and 40 can be confirmed.

According to this invention as described above, since the data sequence is converted to the format for recording on the optical disc for reproducing only and is recorded on the optical magnetic disc, the same behavior as that of the case of accessing to the optical disc for reproducing only can be realized in utilizing this optical magnetic disc, and thus, the debugging processing can be performed easily and speedily.

The nature, principle and utility of this invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 7 is a schematic diagram showing the cutting information;

FIGS. 8A and 8B are schematic diagrams showing the case of converting the command;

FIGS. 9A and 9B are schematic diagrams showing the virtual defect processing;

DETAILED DESCRIPTION OF THE EMBODIMENT

Preferred embodiments of this invention will be described with reference to the accompanying drawings:

(1) General Procedure

Figure 1:
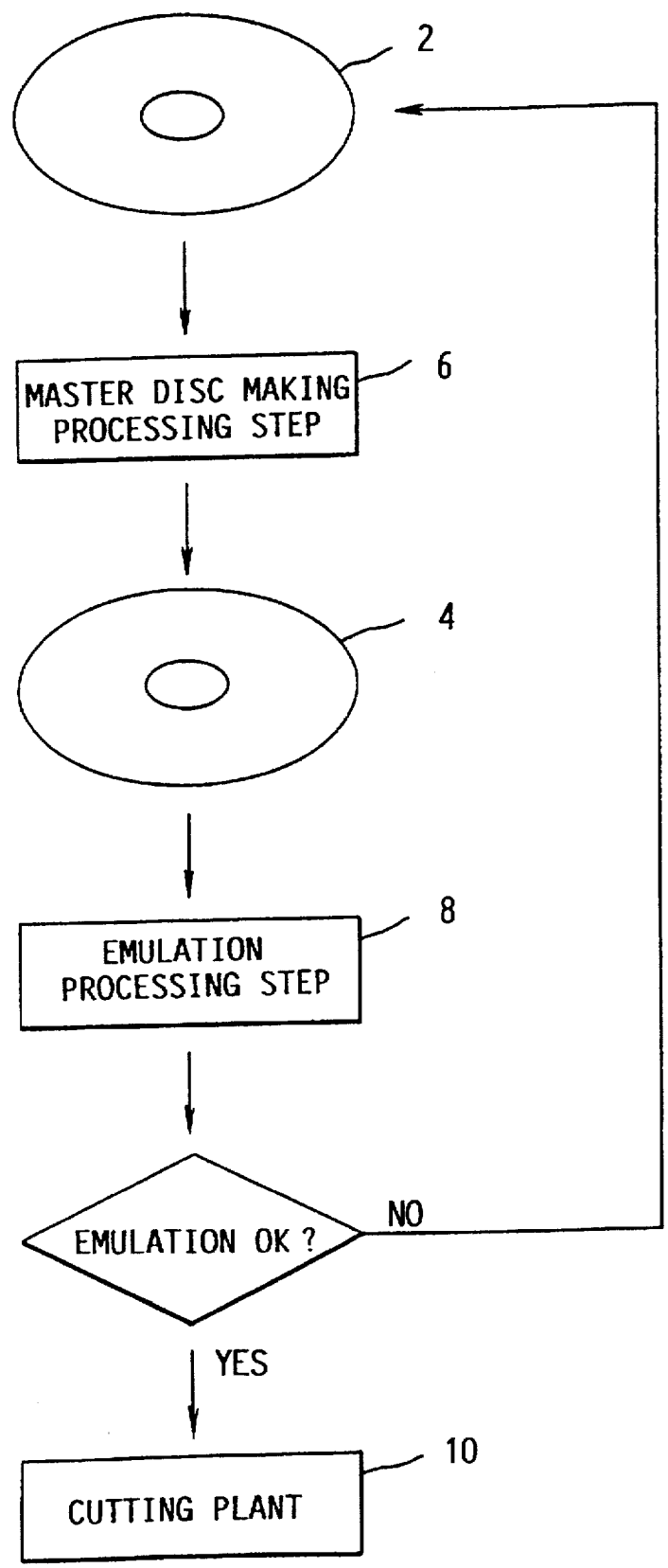
FIG. 1 is a schematic diagram showing production process of the optical disc according to the embodiment of this invention.

FIG. 1 generally shows the production process of an optical disc for reproducing according to this invention, in which at first, the master disc for emulation 4 is produced based on the user data recorded on the user data disc 2.

At this point, this user data comprises software data for recording on the reproducing optical disc and for supplying and it is so arranged that the user data is recorded on the magnetic disc apparatus composed of an external memory unit of computer and the user data disc 2 is formed.

On the other hand, the master disc for emulation 4 comprises an optical magnetic disc which is capable of recording and reproducing, and in the course of this production, the master disc for emulation 4 processes the user data recorded on the user data disc 2 at the master disc production processing step 6 and this user data is recorded and formed with the prescribed format.

Therefore, in this production process, by executing emulation processing step 8 in utilizing the master disc for emulation 4, this user data is recorded on the reproducing optical disc and bugs which may occur at the time when supplying softwares can be detected.

More specifically, if bugs are discovered at this emulation processing step 8, the user data is corrected in this production process and the master disc production processing step is executed again and the master disc for emulation 4 is made out.

With this arrangement, debugging process is repeated and if bugs are no longer detected, the master disc for emulation 4 is sent to a cutting plant 10 in the course of this production, and here, the stamper is made out according to the user data of the master disc for emulation 4.

The process is repeated until the master disc for emulation 4 is sent to the cutting plant 10 is processed at the software house where the user data was made out. Therefore, in the production process, debugging works can be easily repeated and as a whole, supply of softwares can be started in a short period.

At this point, the master disc for emulation 4 can also record cutting information which is necessary for making the reproducing optical disc at the master disc production processing step 6, and the stamper is made out according to this cutting information at the cutting plant 10.

Thereby, in this production process, the user data and the cutting information corresponding to this user data is recorded and processed on the master disc for emulation 4 and thus, erroneous operation by the operator at the time when making the stamper can be avoided in advance and the desired optical disc can be made out certainly.

Furthermore, in this production process, the stamper for the reproducing optical disc and the stamper for the combined type optical disc can be produced.

In the reproducing only optical disc, by shifting the quantity of light of the reflected light in utilizing the unevenness of information recording face as same as compact disc, the information recorded on this information recording face can be reproduced.

On the other hand, in the combined type optical disc, the information recording face is divided into two coaxial circles and in one area the information recording face for reproduction only is formed as well as the optical disc for reproduction only and in the other area the vertical magnetization film for possible recording and reproducing is formed.

With this arrangement, in this production process based on the cutting information, while the stamper for the reproduction only optical disc can be made out in case of only supplying the software, in the case where the software is supplied by obtaining the working area for recording and reproducing the data, the stamper of combined type optical disc can be made out.

(2) Format of Optical Disc and Optical Magnetic Disc

Figure 2:
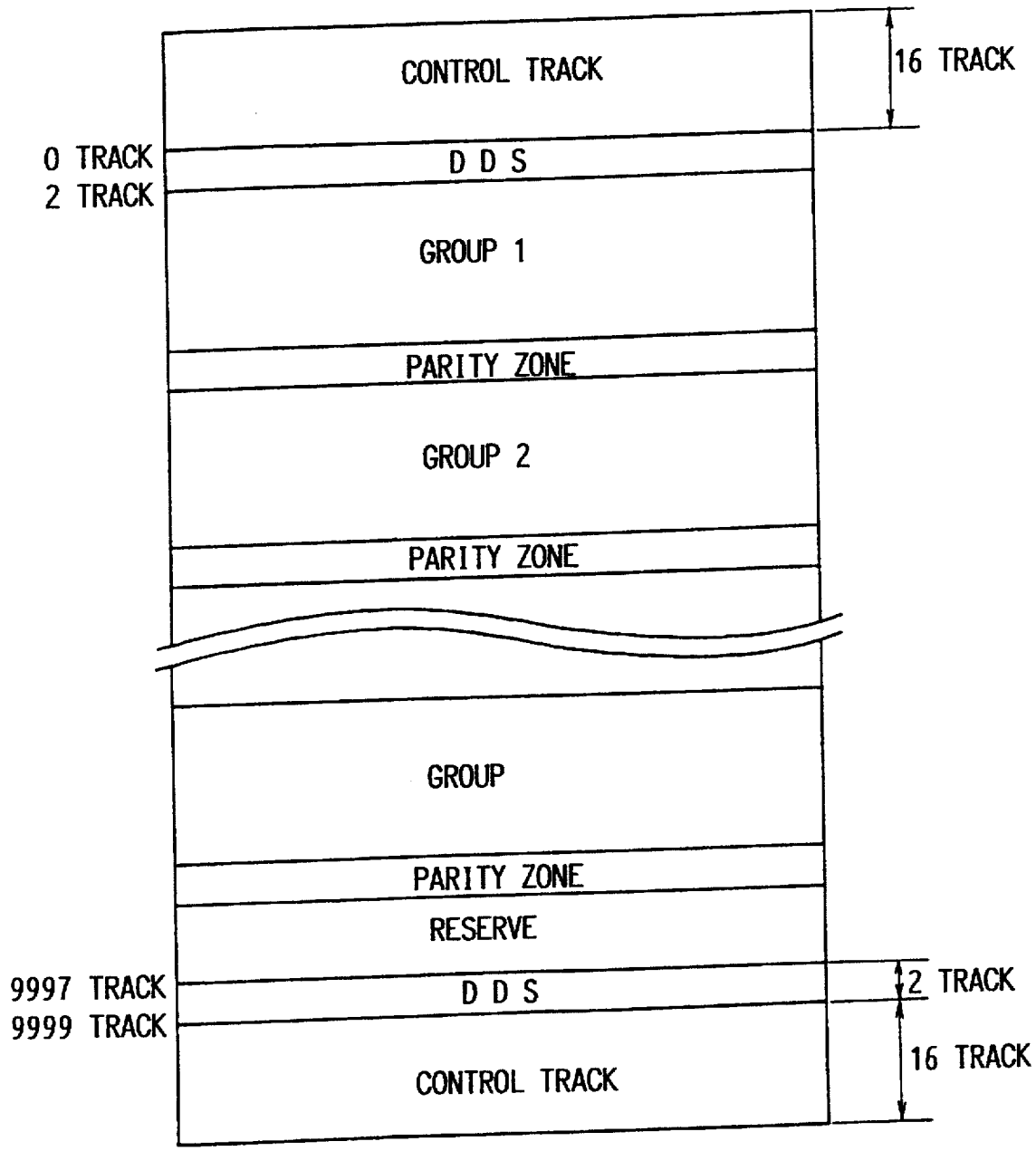
FIG. 2 is a schematic diagram showing the format of an optical disc for reproducing only.

In the reproduction only optical disc the desired data will be recorded by using the format as shown in FIG. 2.

More specifically, in this optical disc, recording tracks are formed in coaxial circles, and 16 tracks of the most inner circles and the most outer circles are assigned as control tracks.

Furthermore, in this optical disc, 0 to 2 tracks and 9997 to 9999 tracks in the rest of recording tracks are assigned to DDS (disc definition structure) respectively, and here various data which are necessary for reproduction of this optical disc are recorded and the remainder of recording tracks are divided into groups and at this point, the user data is recorded.

In this type of optical disc, when recording the user data, a recording track is divided into 25 sectors radially and the user data is recorded on 24 sectors.

Furthermore, in the optical disc, the remaining 1 sector is assigned to the parity sector and by obtaining exclusive OR on the data with 0 to 521 bytes corresponding to each sector, the parity data for error correction is formed and this parity data is recorded on the parity sector.

With this arrangement, in this type of optical disc, error correction capacity can be strengthened as compared with the optical magnetic disc which is capable of recording and reproducing and correct data can be reproduced.

On the other hand, in the combined type optical disc, control track and 0 to 2 tracks disc definition structure are formed similar to the reproducing only optical disc.

On the other hand, in the remaining recording tracks, from 3 tracks to the prescribed track are assigned as possible recording and reproducing zone and furthermore, the rest of tracks are assigned as reproducing only zone and parity sector are formed in this recording tracks for reproducing similar to the reproducing only optical disc.

With this arrangement, in case of recording the user data on this type of optical disc, there are cases where a group of data is recorded putting the parity sector there between, and it is evident that this group of data cannot be reproduced continuously at the time of reproduction.

Accordingly, in the information processing device for reproducing this type of optical disc, in the case where image data of an animation is recorded putting the parity sector between, the movement of the animation stops temporarily at the part of this parity sector.

Therefore, in case of recording the software having this type of image data on the optical disc and supplying it, it is necessary not only to correct the detection of bugs but also to confirm the phenomenon specific to this type which occurs in case of recording on the optical disc.

Furthermore, in case of correcting errors in utilizing the parity sector, since extra time is required for outputting the reproduction data, it is necessary to confirm this waiting time at the software house.

Moreover, it is necessary to confirm whether errors can be corrected or not with the parity sector.

According to this embodiment, by executing emulation processing procedure 8 in utilizing the master disc for emulation 4, the peculiar phenomenon which occurs in case of recording on the optical disc and also the waiting time in case of correcting errors in utilizing the parity sector can be confirmed.

Figure 3:
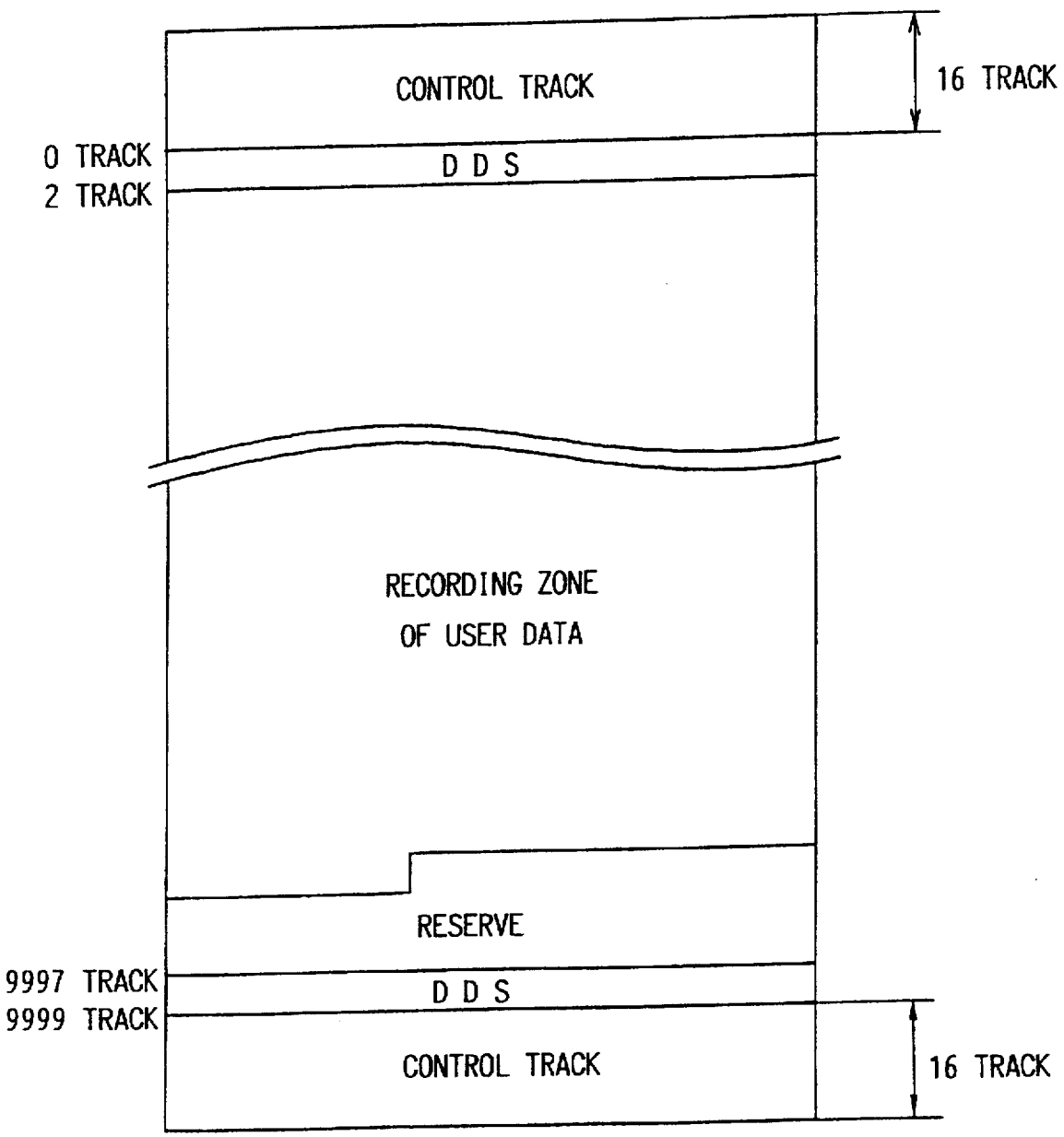
FIG. 3 is a schematic diagram showing the format of an optical magnetic disc.

On the other hand, as shown in FIG. 3, in the optical magnetic disc for making the master disc for emulation 4, the control track and DDS recording zone are formed with the same format as the optical disc, and the recording zone of user data is secured its inner side.

In the recording area of user data including this control track, regarding the zone wherein data cannot be recorded and reproduced correctly, the data can be recorded on the following zone skipping this zone (i.e., slipping process) by certify processing in advance, the information of this backward zone will be recorded in the DDS recording zone.

Then, in this embodiment, since the data sequence to be recorded on the optical disc is recorded on this recording of user data with the format to be recorded on the optical disc, the master disc for emulation 4 is made out and the emulation processing procedure can be performed with the aid of this master disc for emulation 4.

(3) Information Processing Unit

Figure 4:
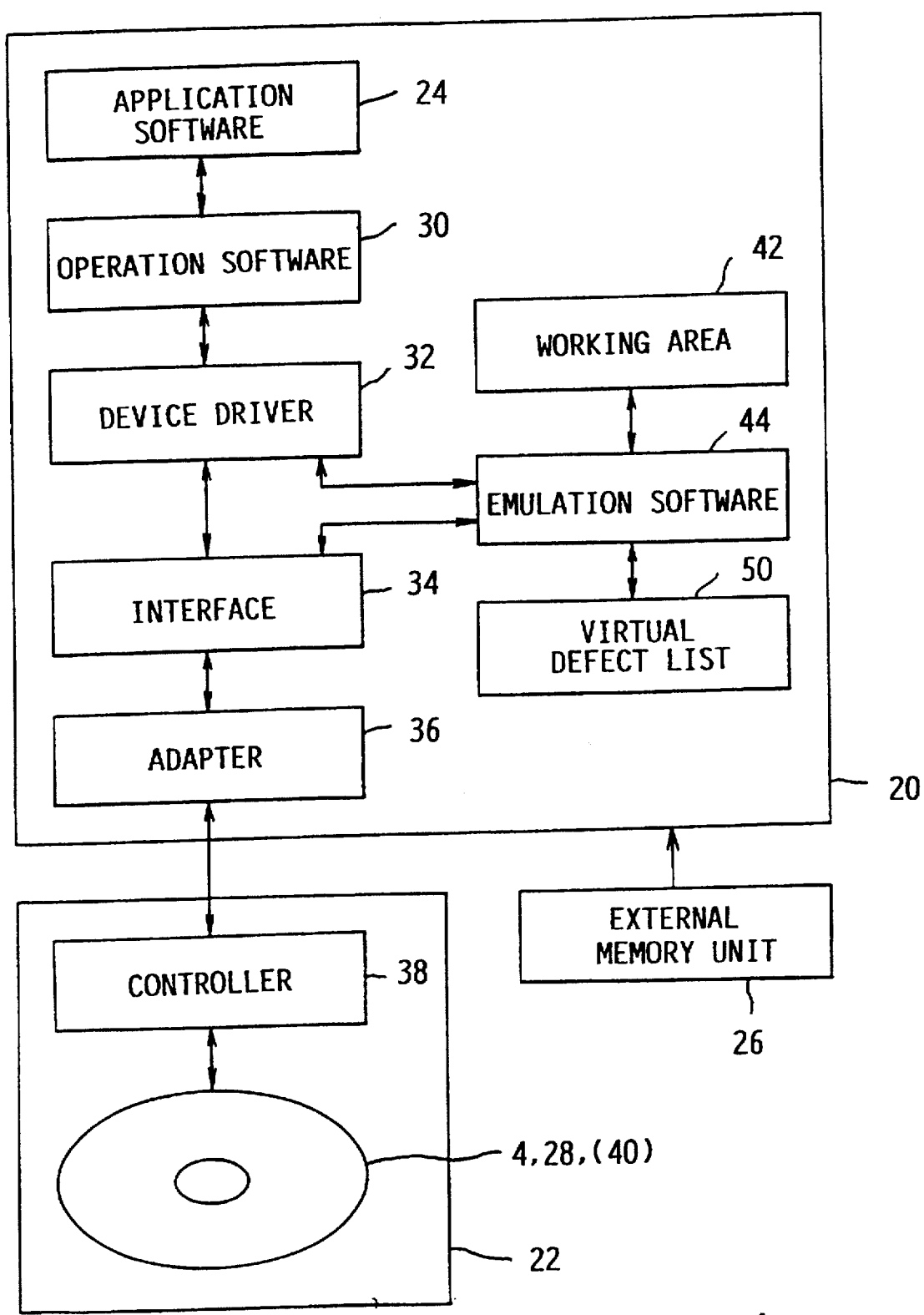
FIG. 4 is a block diagram illustrating the general construction of an information processing device.

In FIG. 4, 20 generally shows the information processing device connected with an optical disc apparatus 22. In this embodiment, the information processing device 20 executes the desired information process according to the software to be supplied via an optical disc 28 and executes star disc production procedure, emulation reproducing procedure and further executes debugging process in the disc producing process.

More specifically, in the information processing device 20 constituted by calculation processing device, the desired information process can be executed according to an application software 24, and at this time an optical disc 28 is reproduced at the disc device 22 according to demand and various processing softwares and also video data and audio data, etc. are supplied through this optical disc 28.

Accordingly, in the information processing device 20, various information processes can be performed according to softwares supplied from the optical disc 28, and at this time an external memory unit 26 constituted by magnetic disc device is driven according to demand.

In the information processing device 20, in case of driving this optical disc apparatus 22, when the optical disc 28 is loaded on the optical disc 22, operation software 30 is executed according to the application software 24 and thus the command of logic drive is outputted through the device driver 32 constituted by CAM (common access method).

On the other hand, the device driver 32 forms CCB (CAM control block) which is blocked LBA (logical block address), and this CCB is transmitted to an adapter 36 through an interface 34.

The adapter 36 converts the command of logic drive constituted by the CCB to the physical drive command and outputs to the optical disc apparatus 22, and the optical disc apparatus 22 receives this command at the controller 38.

With this arrangement, the optical disc apparatus 22 gives access to the optical disc 28 through the controller 38 and the desired data can be reproduced. Furthermore, in the information processing device 20 this reproduced data is inputted and can be processed.

In the optical disc apparatus 22 the optical magnetic disc 40 can be recorded and reproduced in place of the optical disc 28 and in the case where the optical magnetic disc 40 is loaded in the optical disc apparatus 22, a command, such as record, can be outputted in the information processing device 20.

Furthermore, in case of analyzing the LBA issued from the information processing device 20 and accessing to the optical disc 40, the controller 38 accesses to the optical magnetic disc 40 according to the backward information recorded on the DDS recording zone, and thus the information processing device 20 issues LBA and can access to the optical magnetic disc 40 regardless of the existence of backward processing.

(3-1) Master Disc Production Processing Procedure

In the information processing device 20, by processing user data stored in an external memory unit 26, this area is divided into the prescribed block units and the parity data is formed in utilizing the prescribed working area 42 in accordance with softwares for producing the master disc.

With this arrangement, in the information processing device 20, user data of the external memory unit 26 is converted to the format for recording on the optical disc 28, and the resultant conversion data is transmitted sequentially to the optical disc apparatus 22 with the prescribed order and thus, user data of the external memory unit 26 is recorded on the user data recording zone of the optical magnetic disc 40 according to the format of the optical disc 28.

At this point, in the information processing device 20, while the parity sector for one sector is formed for the user data for 24 sectors by recording the conversion data per the prescribed block unit, in the controller 38, by accessing DDS information of the optical magnetic disc 40 and slipping processing, the conversion data is recorded.

Figure 5:
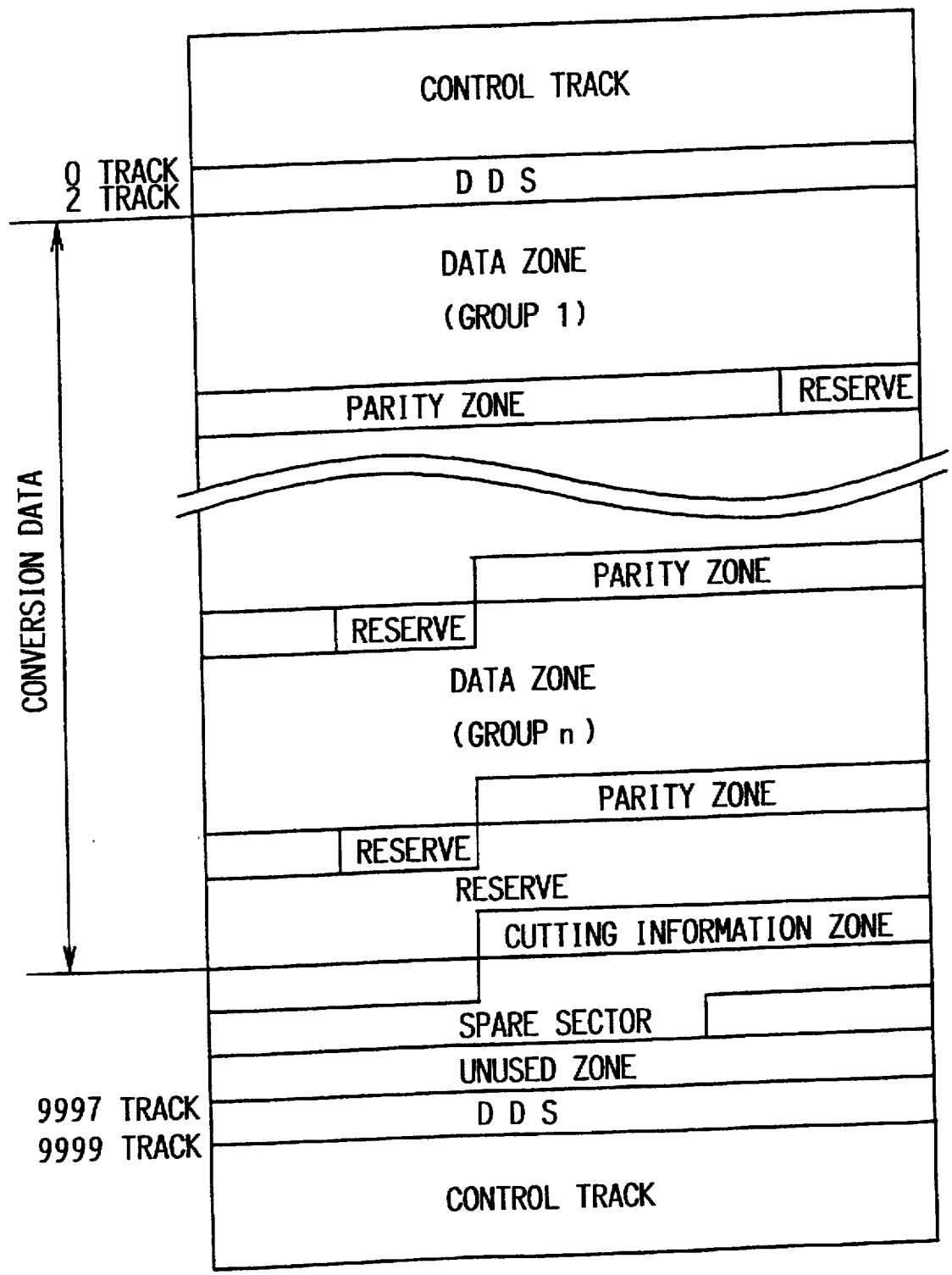
FIG. 5 is a schematic diagram showing a master disc for emulation of a reproducing only optical disc.

Accordingly, as shown in FIG. 5, in the information processing device 20, the conversion data is recorded on the user data recording area assigned for the optical magnetic disc 40 with the format identical to those of the case of recording the data on the optical disc 28.

At this point, in the information processing device 20, by recording the conversion data in utilizing the optical magnetic disc certify processed, the reliability in case of performing the emulation process of the optical disc is secured in utilizing the optical magnetic disc.

Figure 6:
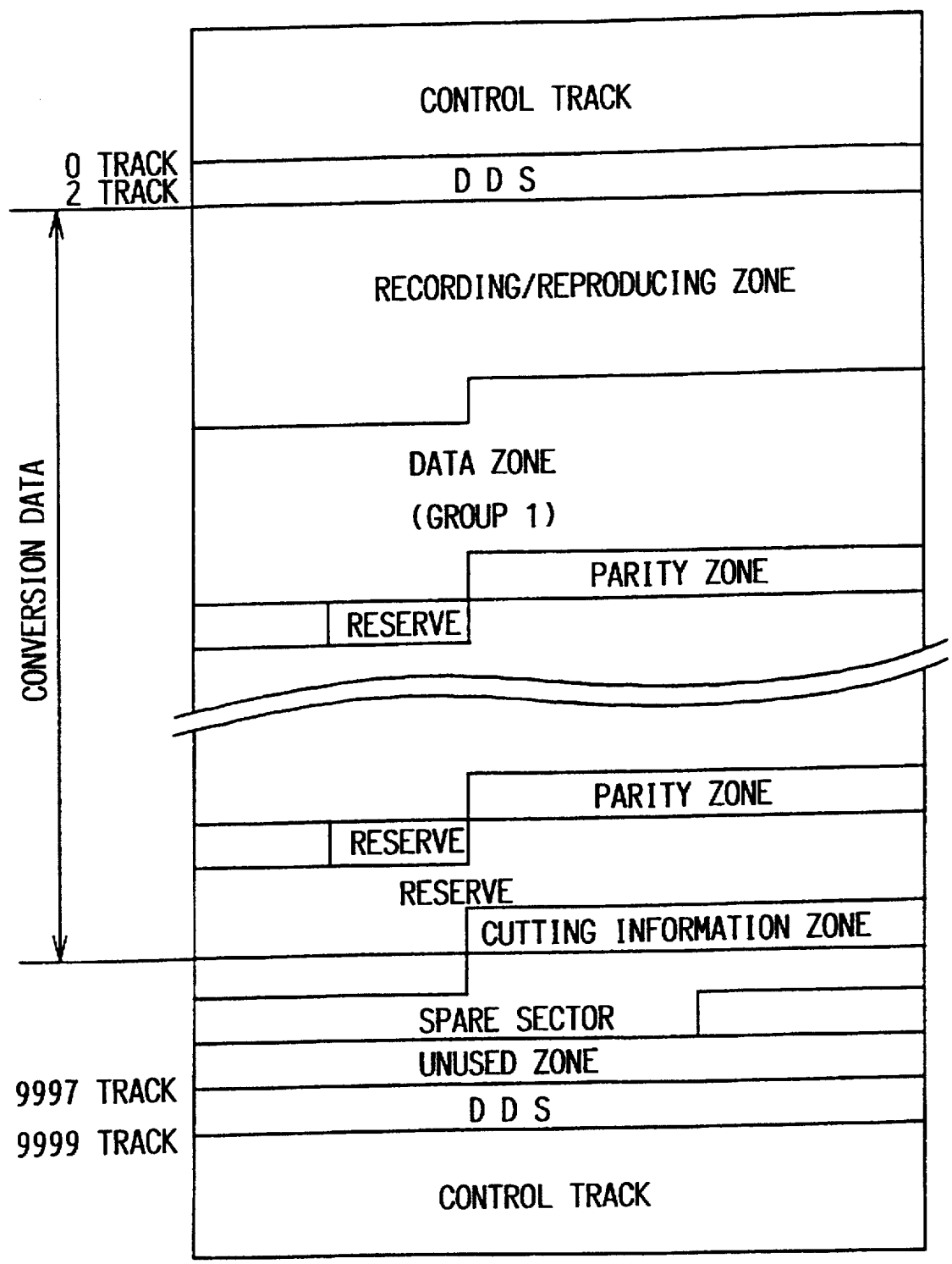
FIG. 6 is a schematic diagram showing a master disc for emulation of a combined type optical disc.

Furthermore, at this point, in the information processing device 20, the conversion data regarding the data to be assigned to the recording and reproducing zone of the combined type optical disc is formed and recorded, and thus, as shown in FIG. 6 the master disc for emulation 4 can be made out.

In the master disc for emulation 4 of this combined type optical disc, by assigning the recording and reproducing zone to the zone of 0 to 2 track side, the recording and reproducing zone is assigned in the same manner as the actual combined type optical disc.

Furthermore, in the information processing device 20, cutting information is recorded at the end of conversion data putting the prescribed reserve zone between when making out the master disc for emulation 4 and in the cutting plant 10, the stamper for making optical disc can be made out according to this cutting information.

At this point, as shown in FIG. 7, the cutting information will be recorded on the zones from the last LBA to the top 24 sectors and the first 6 sectors are assigned to the control track information and the next 6 sectors are assigned to the DDS information zone.

In this control track information, the necessary data for making out the control track of the optical disc is assigned at the cutting plant 10.

On the other hand, in the DDS information, the data necessary for forming the DDS recording zone of optical disc is allocated in the cutting plant 10, and more specifically, 0 to 20 byte data to be recorded on the DDS information recording zone of the optical disc are recorded.

With this arrangement, in the cutting plant 10, this control track information and the DDS information are reproduced and the stamper of optical disc can be made out.

On the other hand, in the information processing device 20, the construction of the master disc for emulation 4 will be detected after reproducing the DDS information recorded as the cutting information in the course of emulation processing procedure, and simultaneously, the address conversion process can be executed in case of accessing to the master disc for emulation 4 at the LBA for optical disc based on this DDS information.

Further to the control track information and the DDS information, the same data are recorded for six times repeatedly, and thus, the reliability at the time of recording and reproducing can be improved, and accordingly, emulation process and stamper making process can be performed correctly.

On the other hand, 6-sector zone where the cutting information continues is assigned as the zone for extension and secured in order that various data can be recorded according to demand and in the following 7 sectors, the message zone is assigned.

This message zone is assigned to the zone where the software house can freely use and the character sequence of the fixed format can be recorded.

Thus, in the information processing device 20, the past record of user data and messages to contact with the cutting plant, etc. can be recorded by using this zone according to demand, and the usability can be improved in the master disc for emulation 4.

In the information processing device 20, after recording the conversion data, the necessary cutting information can be inputted in the form of dialogue by operating the keyboard according to the software for making the master disc.

Thus, in the information processing device 20, the data necessary for making the stamper can be recorded on the master disc for emulation 4 in the necessary form without exception.

Since the information for making out the stamper is recorded with the data for making the stamper, the master disc for emulation 4 is sent out to the cutting plant 10 after the emulation process is executed and the desired optical disc can be certainly produced.

More specifically, in the conventional cutting plant 10, the data to be recorded on the user zone of the optical disc is inputted to the magnetic disc, magnetic tape, etc. and accepted, and moreover, the information necessary for cutting is accepted separately.

Therefore, in the cutting plant 10, since it is necessary to control the data to be recorded and the information necessary for cutting corresponding to this data separately, it has a weak point that the management becomes complicated.

Also in the software house, there were cases where the production of optical disc was asked under the condition that a part of the information necessary for cutting was missing and there were also cases where the information were not necessarily appropriate.

However, as in this embodiment, if the information for making the stamper is recorded with the data for making the stamper, the data for recording and the information for producing can be controlled unitarily and accordingly, the management can be simplified and also mistakes by the operator can be decreased.

Furthermore, at this point, since the data necessary for making the stamper can be recorded on the master disc for emulation 4 in the necessary form without exception, the information of stamper making can be obtained certainly and the optical disc can be made out speedily and certainly.

Moreover, at this point, in the information processing device 20, since this cutting information is recorded at the end of the conversion data, this cutting information can be extended according to demands, and the usability can be improved accordingly.

Furthermore, by recording at the end as described above, the master disc for emulation 4 having a large capacity can be made out with the aid of capacity of the optical magnetic disc most effectively.

In this connection, by recording the user data accordingly, in case of producing the master disc for emulation 4 on the optical disc with the maximum capacity, 255 spare sectors can be formed and at the time when the capacity is small, 1024 spare sectors can be formed corresponding to the ISO standard.

Furthermore, since the cutting information is thus recorded at the end of conversion data, in the cutting plant the conversion data can be read out successively from the top of the user data zone and the stamper can be made out and thus, stamper making works can be simplified.

Also, by recording the parity data, the parity data making process in the cutting plant can be simplified and the production work can be simplified further.

(3-2) Emulation Processing Procedure

With this arrangement, after producing the master disc for emulation 4, an emulation software 44 (FIG. 4) is started as permanently stationing routine in the information processing device 20.

The emulation software 44 monitors the CCB to be outputted from the device driver 32 and by dedicating this CCB pointer, communications are started between the device driver 32 and the interface 34.

Thus, in the information processing device 20, when emulation processing procedure is started, the direct communication between the device driver 32 and the interface 34 is stopped and is communicated through the emulation software 44.

At this point, in the information processing device 20, when the controller 38 starts the emulation processing procedure, the construction of master disc for emulation 4 will be detected by reproducing the controller track and DDS information of the master disc for emulation 4.

Then, the information processing device 20 detects the end of user data recording zone (i.e., last LBA) according to the DDS information of the master disc for emulation 4 and reproduces the cutting information in accordance with the detection result.

Furthermore, in the information processing device 20, by analyzing the cutting information at the emulation software 44 the control track information and the DDS information assigned to this cutting information are detected.

Then, the information processing device 20 starts the reproducing process of the master disc for emulation 4 according to application software 24 and at this point, the CCB to be outputted from the device driver 32 is address converted based on the DDS information detected and the CCB is reformed, and this reformed CCB is outputted to the interface 34.

At this point, in the device driver 32, the pointer of CCB is set to the prescribed value and outputted, and the emulation software 44 detects the command of CCB based on this pointer and when this command is the access command of the optical disc, the address conversion process is performed and the CCB is performed.

With this arrangement, in the information processing device 20, when the optical disc apparatus 22 is observed from the application software 24 side, the command can be issued as if the reproducing only optical disc or the combined type optical disc is accessed and thus, bugs of the application software 21 and moreover, bugs for the data to record on the optical disc can be detected according to demands.

In the information processing device 20, this LBA address conversion process is executed based on the DDS information recorded as the cutting information.

More specifically, in the information processing device 20, the calculation process of the following equation is performed according to the emulation software 44 and the CCB address data issued by the device driver 32 is converted.

$$Y = \left( \frac{X}{n} \right)(n+m) + X\%n \tag{1}$$

Here, "X" shows OBA of the optical disc issued by the device driver 32, "Y" shows OBA of the master disc for emulation 4 converted at the emulation software 44, "n" shows the sector number of one group of the optical disc, "m" shows the sector number of one parity group of the optical disc, and "%" shows the round process.

At this point, in the information processing device 20, if the write command CCB is issued to the master disc for emulation 4 of the reproducing only optical disc, this write command is detected at the emulation software 44 and displays error message on the prescribed display unit.

Thus, in the information processing device 20, by detecting the write command outputted erroneously, the debugging process can be simplified.

In practice, in the case where the optical magnetic disc capable of recording and reproducing is used as the recording medium for emulation, it can function at the time when the write command is issued by merely confirming whether it can be processed or not at the application software 24. This kind of bug cannot be detected.

However, if the write command is detected separately, the bug in case of using the reproducing only optical disc only can be detected in advance.

On the other hand, in the information processing device 20, when the write command CCB is issued to the master disc for emulation 4 of the combined type optical disc, this CCB address is detected and thus, at the time when the write command is issued to the reproduction only area of combined type optical disc, error message is displayed on the prescribed display unit.

Thus, in the information processing device 20, regarding the master disc for emulation 4 of the combined optical disc, debugging process can be simplified by detecting the write command outputted erroneously.

On the other hand, the information processing device 20 detects the length of data to be read out and judges whether to stop over the parity sector or not at the time when the CCB of read command is issued.

More specifically, the information processing device 20, as shown in FIGS. 8A and 8B for example, if the command to read the data of L sector is issued from the LBA (X1) at the application software 24 (FIG. 8A), judges whether the relationship of the following equation exists or not according to the emulation software 44.

$$X1 \% n + L > n \tag{2}$$

More specifically, in this type of optical disc, when the relationship of equation (2) exists, it can be judged that this series of data is recorded putting the parity sector between and divides the CCB of this read command and converts to the first read command (read 1) on the sector (x 1/n)(n+m) +(n−1) from LBA (X1) and the second read command (read 2) on the sector (x 1/n+1)(n+m)+(L−n+x1%n−1) from LBA ((x1/n+1)(n+m)) in front and in rear of the parity sector respectively (FIG. 8B).

Thus, in the information processing device 20, the CCB is reproduced by this read command and the CCB reproduced is outputted successively to the optical disc apparatus 22.

Accordingly, in the application software 24, the same response as in the case where the read command is actually issued to the optical disc having the parity sector can be obtained and whether a series of data sequence can be reproduced in real time or not can be confirmed.

Thus, in the information processing device 20, for example, regarding the image data of animation, the specific problem for the optical disc, such as, the movement stops on its way, can be confirmed speedily and accordingly, the debugging process can be simplified.

(3-3) Defect Processing Procedure

With the above arrangement, debugging process of user data recorded on the application software 24 and the master disc for emulation 4 has been terminated in utilizing the master disc for emulation 4, and in the information processing device 20, defect processing according to the emulation software 44 is executed.

This defect processing is the process to confirm whether or not errors can be corrected in utilizing parity data and to confirm processing time case of the error correcting process, and is executed according to the virtual defect list 50 (FIG. 4).

More particularly, as shown in FIGS. 9A and 9B, in the information processing device 20, the fixed sector can be assigned in advance through the fixed input means (FIG. 9A), and thus, for example, LBA (Y) sector in L sector is assigned from the LBA (X1) (i.e., sector X1<Y<X1+L−1) and this assigned sector will be multiple registered and the virtual defect list can be made out.

Figure 10:
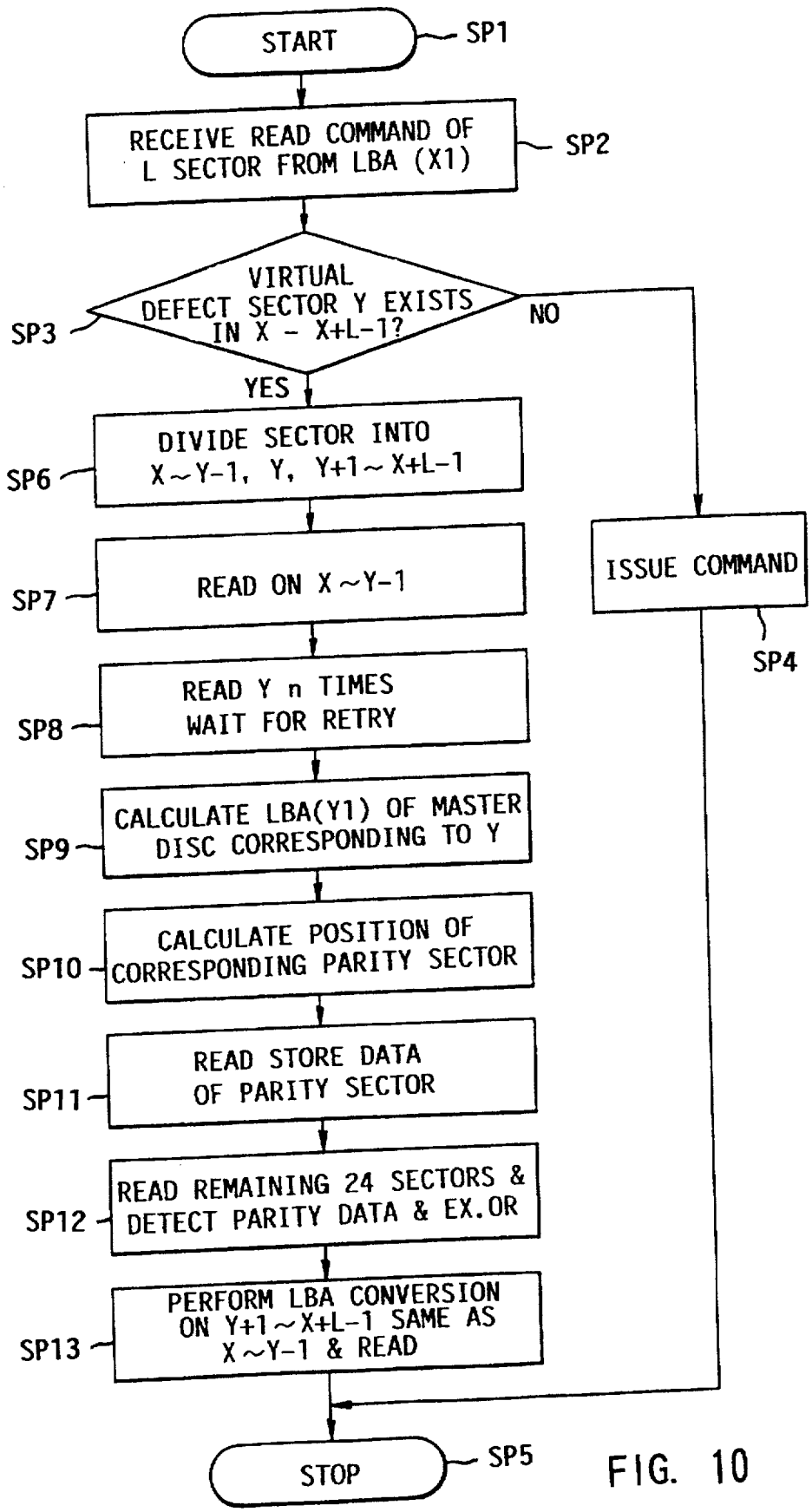
FIG. 10 is a flow chart explaining the steps involved in virtual defect processing.

As shown in FIG. 10, in the information processing device 20, when the read command of L sector from LBA (X1) at the device driver 32 is issued for the assigned sector (hereinafter referred to as the virtual defect sector), proceeds from the step SP1 to the step SP2 and this command is analyzed at the emulation software 44.

Here, the information processing device 20 proceeds to the step SP3 and accesses the virtual defect list 50 and by judging whether the relationship of the following equation exists or not, judges whether or not the virtual defect sector Y exists in L sector from LBA (X1) to be assigned by the read command.

$$X1 \leq Y \leq X1+L-1 \tag{3}$$

At this point, if a negative result is obtained, the information processing device 20 proceeds to the step SP4 and after converting address based on the DDS information and issuing CCB, proceeds to the step SP5 and completes the processing procedure.

On the other hand, if an affirmative result is obtained at the step SP3, the information processing device 20 proceeds to the step SP6 and after dividing the address data into X1 to Y−1, Y+1 to X1+L−1, issues the read command at the following step SP7 for the first sector X1 to Y−1 (FIG. 9B).

More specifically, in the information processing device 20, after address converting the address data for this sector X1 to Y−1 to LBA on the master disc for emulation 4 and then forming CCB in utilizing the address data converted, this CCB is outputted from the emulation software 44 to the interface 34.

At this point, by judging whether the relationship of equation (2) exists or not, the information processing device 20 judges whether the parity block exists between the sector X1 to Y−1 or not, and if the parity block exists, as described above concerning the equation (2), successively reads sectors in front and in rear of the parity block by dividing and issuing the command.

Thus, the information processing device 20 inputs the reproducing data for the sector in front of the virtual defect sector.

Then, the information processing device 20 proceeds to the step SP8 and stops the processing for n times of read retry on the sector Y.

More specifically, if the read out of this sector Y is failed in actual optical disc 28, the fixed number of times of read retry are performed in the optical disc apparatus 22.

In the information processing device 20, by stopping the processing for n times corresponding to the number of read retries, the condition similar to that of the case where the defect actually occurred in the sector Y observing from the application software 24 can be formed, and at the time when the real time processing is required, it can judge whether it functions correctly or not.

Then, the information processing device 20 proceeds to the step SP9 and executes the calculation process of the following equation and detects OBA (Y1) on the master disc for emulation 4 corresponding to the sector Y and moves to the step SP10.

$$Y1 = \left( \frac{Y}{n} \right) (n+m) + Y\%n \qquad (4)$$

At this point, the information processing device 20, by detecting the parity sector in the range of LBA "(Y1/25)×25" to "(Y1/25)×25+24", detects the parity sector on the master disc for emulation 4 corresponding to this LBA "Y1".

Furthermore, the information processing device 20 issues the read command for this corresponding parity sector at the step SP11 and inputs the data of parity sector and proceeds to the step SP12.

At this point, the information processing device 20, after issuing the read command for 25 sectors from (Y1/25)×25 sectors excluding the virtual defect sector and inputting the data, by executing the exclusive OR calculation process in each byte, forms the data of virtual defect sector from data sectors, excluding the virtual defect sector and corresponding parity sectors.

Then, the information processing device 20 corrects errors of the virtual defect sector in utilizing the parity sector in the same manner as in the case where the optical disc device 22 actually performs error correction process and then, proceeds to the step SP13 and the read command is issued to the remaining sector Y+1 to X1+L−1.

At this point, when the parity block exists between the sector X1 to Y−1, as well as the read command is issued to the sector X1 to Y−1, the information processing device 20 divides and issues command, and proceeds to the step SP5 and terminates the processing procedure.

Thus, in the information processing device 20, by executing the application software 24 successively according to the emulation software 44, the virtual defect process is executed on the virtual defect sector registered in the virtual defect list 50 and thus, the condition on which the virtual defect sector cannot be reproduced can be produced again, and whether or not errors can be corrected and the time required for correcting errors can be examined.

Accordingly, the time and procedure required for debugging process can be further shortened.

Figure 11:
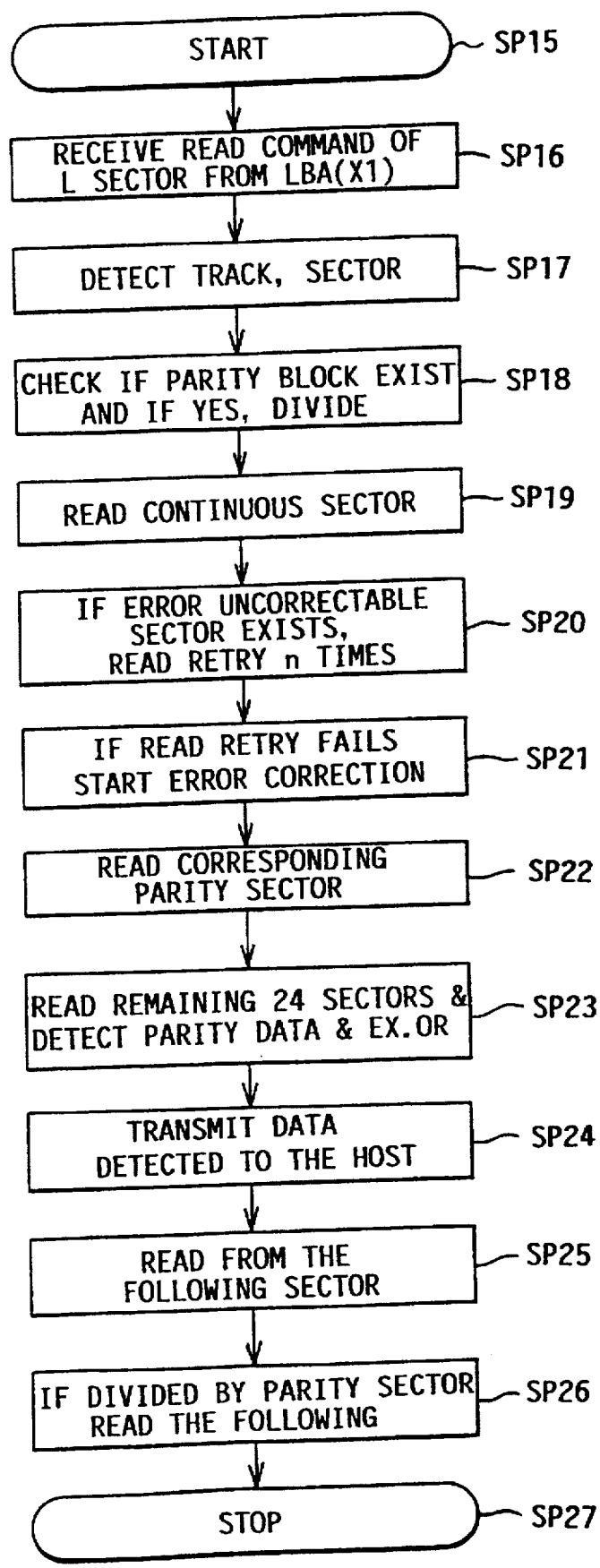
FIG. 11 is a flow chart explaining the step involved in actual defect processing.

In this connection, in case of reproducing the optical disc, if the sector is difficult to reproduce, the processing procedure as shown in FIG. 11 is executed and an error correction process is performed in the optical disc apparatus 22.

More specifically, when read command is issued, the optical disc apparatus 22 proceeds from the step SP15 to the step SP16 and after this read command is inputted to the controller 38, proceeds to the step SP17.

Here, the controller 38 detects tracks and sectors of LBA (X1) and proceeds to the step SP18 and judges whether the parity block is included or not in L sector continued from this track and sector and if the parity block is included, detects the necessary tracks and sectors in front and in rear of the parity block.

Then, the controller 38 proceeds to the step SP19 and issues read command for a series of L sector based on the track and sector detected at this point, and proceeds to the step SP20.

At this point, if sectors are difficult to correct with error correction codes added to the user data of each sector of the sector in point is re-read up to n times.

Here, in the case where error correction is difficult even if read retry is performed, the controller 38 proceeds to the step SP21 and starts error correction process by utilizing the parity sector on the corresponding sector.

More specifically, the controller 38 proceeds to the step SP22 and detects the position of the parity sector (i.e., track and sector) corresponding to the sector in point and reads the parity data of parity sector.

Then, the controller 38 proceeds to the step SP23 and reproduces data of sectors except the sectors which are not error corrected, and the calculation process of exclusive OR is executed in every byte and reproduction data are formed on the sectors which could not be error corrected.

Furthermore, the controller 38 proceeds to the step SP24 and upon transmitting the data formed to the host, reproduces the user data on the sectors at the following step SP25.

Then, the controller 38 proceeds to the step SP26 and repeats the reproduction process on the sector divided by the parity block and then proceeds to the step SP27 and terminates the processing procedure.

Thereby, in the information processing device 20, it is apparent that the condition similar to that in the case of defect processing in the actual optical disc apparatus 22 for the application software 24 can be formed by executing the virtual defect process.

(4) Effects of the Embodiment

According to the foregoing construction, by recording the user data on the optical magnetic disc capable recording and reproducing according to the format of the optical disc and by making the master disc for emulation 4, debugging process can be performed in utilizing this master disc for emulation 4 and thus, the time required for debugging process can be shortened.

Furthermore, at this point, by recording the cutting information with the user data, the master disc for emulation 4 debugging processed is sent to the cutting plant and stamper can be formed easily and certainly.

Moreover, in the debugging process, by accessing to the master disc for emulation 4 after address conversion, and reforming the command corresponding to the parity sector, and furthermore, by performing the virtual defect process the emulation process can be executed under the same condition as in the case of accessing to the actual optical disc and the debugging process can be performed certainly.

(5) Other Embodiments

Furthermore, the embodiment described above has dealt with the case of emulation processing by adding the emulation software to the device driver/common access routine constituted by, so called CAM. However, this invention is not only limited to the above but also widely applicable to the case where the emulation software is used as permanent routine in utilizing the extension memory area in the system having the extension memory area for the adapter, for example.

While there has been described in connection with the preferred embodiments of this invention, it will be obvious to those skilled in the art that various changes and modifications may be aimed, therefore, to cover in the appended claims all such changes and modifications as fall within the true spirit and scope of the invention.

What is claimed is:

1. A data recording method, comprising the steps of:
converting a data sequence to be recorded on a reproducing only optical disc into a format for recording said data sequence on said reproducing only optical disc, the data sequence having an address which is one of sequentially incremented and sequentially decremented, the format having an error correction code at every predetermined data length;

recording said converted data sequence on a recording and reproducing optical magnetic disc;

reproducing said recorded converted data sequence from the recording and reproducing optical magnetic disc;

based upon said reproduced recorded converted data sequence and said format, emulating a reproduction of said data sequence from said reproducing only optical disc; and confirming a behavior of said data sequence based upon said emulation, said behavior indicative of the reproduction of said data sequence from said reproducing only optical disc.

2. A data recording method according to claim 1, wherein said reproducing only optical disc contains a recording area divided into 25 sectors, one sector of which is allocated as a parity sector, the recording area surrounded on both a front and a rear by a control track and a disc definition structure.

3. A data recording method according to claim 2, further comprising the step of:

recording on said recording and reproducing optical magnetic disc preparation data for said reproducing only optical disc when recording said converted data sequence.

4. A data recording method according to claim 3, further comprising the step of:

recording on said recording and reproducing optical magnetic disc prescribed management data in addition to the preparation data for said reproducing only optical disc when recording said converted data sequence.

5. An optical disc apparatus for emulating data reproduced from a reproducing only optical disc, comprising:

means for generating formatted data by converting a data stream, whose address is one of sequentially incremented and sequentially decremented, into a format of the reproducing only optical disc, said format having an error correction code at every predetermined data length;

means for recording said formatted data on the recording and reproducing optical disc;

means for converting input logical address data for reproducing the data recorded on said recording and reproducing optical disc into converted logical address data which includes an offset value corresponding to said error correction code; and means for generating data which emulates the data stream as reproduced from said reproducing only optical disc by reproducing, in accordance with said converted logical address data, the formatted data recorded on the recording and reproducing optical disc.

6. An optical disc apparatus according to claim 5, further comprising:

a disc driver for driving said reproducing only optical disc and said recording and reproducing optical disc, said disc driver accessing said reproducing only optical disc upon a conversion of a logical driving command output from an information processing device into a physical driving command, and said disc driver accessing said recording and reproducing optical disc in place of said reproducing only optical disc when said means for converting input logical address data converts said logical driving command into said physical driving command.

7. An optical disc apparatus according to claim 6, wherein said reproducing only optical disc contains a recording area for said data sequence, said recording area divided into 25 sectors, one sector of which is a parity sector;

said recording and reproducing optical disc is adapted to record said data sequence and said parity sector;

and said optical disc apparatus further comprises:

sector assignment means for assigning one of said sectors of said reproducing only optical disc when reproducing from said recording and reproducing optical disc, said optical disc apparatus operative to reproduce data of said parity sector corresponding to said sector assigned and data of sectors excluding said assigned sector corresponding to said parity sector, and to form an exclusive OR resulting from said reproduction so as to form data of said sector assigned theretofore.

8. The apparatus of claim 7, wherein said recording area is surrounded on both a front and a rear by a control track and a disc definition structure.

9. The apparatus of claim 5, wherein said recording and reproducing optical disc comprises:

an optical magnetic disc.

10. A method for emulating data reproduced from a reproducing only optical disc by using a recording and reproducing optical disc, comprising the steps of:

generating formatted data by converting a data stream, whose address is one of sequentially incremented and sequentially decremented, into a format of the reproducing only optical disc, said format having an error correction code at every predetermined data length;

recording said formatted data on the recording and reproducing optical disc;

converting input logical address data for reproducing the data recorded on said recording and reproducing optical disc into converted logical address data which includes an offset value corresponding to said error correction code; and generating data which emulates the data stream as reproduced from said reproducing only optical disc by reproducing, in accordance with said converted logical address data, the formatted data recorded on the recording and reproducing optical disc.

11. The method of claim 10, wherein said recording and reproducing optical disc comprises:

an optical magnetic disc.

12. The method of claim 10, wherein said reproducing only optical disc contains a recording area that is divided into 25 sectors, one sector of which is allocated as a parity sector, the recording area surrounded on both a front and a rear by a control track and a disc definition structure.

* * * * *